United States Patent [19]

Pirio et al.

[11] Patent Number: 5,343,322
[45] Date of Patent: Aug. 30, 1994

[54] SYSTEM OF VERY-LONG-DISTANCE DIGITAL TRANSMISSION BY OPTICAL FIBER WITH COMPENSATION FOR DISTORTIONS AT RECEPTION

[75] Inventors: Francis Pirio; Jean Thomine, both of Paris, France

[73] Assignee: France Telecom, Paris, France

[21] Appl. No.: 995,816

[22] Filed: Dec. 23, 1992

[30] Foreign Application Priority Data

Dec. 31, 1991 [FR] France .................. 91 16488

[51] Int. Cl.$^5$ ...................... H04B 10/12; H04B 10/00
[52] U.S. Cl. .................... 359/173; 359/161; 385/28
[58] Field of Search ........ 359/130, 161, 173, 181–182, 359/188, 195, 111; 385/3, 27–28

[56] References Cited

U.S. PATENT DOCUMENTS

| | | | |
|---|---|---|---|
| 4,067,642 | 1/1978 | King et al. | 385/27 |
| 4,261,639 | 4/1981 | Kogelnik et al. | 385/27 |
| 4,969,710 | 11/1990 | Tick et al. | 385/123 X |
| 4,979,234 | 12/1990 | Agrawal et al. | 359/173 |
| 5,119,447 | 6/1992 | Trisno | 385/3 |
| 5,166,821 | 11/1992 | Huber | 359/173 |
| 5,224,183 | 6/1993 | Dugan | 385/24 |
| 5,261,016 | 11/1993 | Poole | 385/28 |

FOREIGN PATENT DOCUMENTS

| | | | |
|---|---|---|---|
| 2269309 | 2/1990 | Japan . | |
| 2240683 | 8/1991 | United Kingdom | 359/161 |

OTHER PUBLICATIONS

Koch and Alferness: *Dispersion Compensation by Active Predistorted Signal Synthesis*, Journal of Lightwave Technology, vol. LT-3, No. 4, Aug. 1985, pp. 800–805.
Saito et al.: *Prechirp Technique for Dispersion Compensation for a High-Speed Long-Span Transmission*, IEEE Photonics Technology Letters, vol. 3, No. 1, Jan. 1991, pp. 74–76.
Blow et al.: *Nonlinear Limits on Bandwidth at the Minimum Dispersion in Optical Fibres*, Optics Communications, vol. 48, No. 3, Dec. 1983, pp. 181–184.
Gnauck et al.: *Dispersion Penalty Reduction using an Optical Modulator with Adjustable Chirp*, IEEE Photonics Technology Letters, vol. 3, No. 10, Oct. 1991, pp. 916–918.
K. Iwashita et al. *Chromatic Dispersison Compensation in Coherent Optical Communications* Journal of Lightwave Technology, vol. 8, No. 3, Mar. 1990, New York US pp. 367–375.
Blow and Doran *Non linear effects in optical fibres and fibre devices* IEEE Proceedings, Jun. 1987, pp. 138–144.
Agrawal; *Non linear fiber optics;* Academic Press, Chapter 2, Chapter 6.
Gnauck and al; *Dispersion penalty reduction using a optical modulator with adjustable chirp* OFC 1991. Post--deadline n 17.
Koyama et al.; *Compensation of nonlinar pulse distortion in optical fiber by employing prechirp technique* ECOC 91. WcC7-2, pp. 469–472.

*Primary Examiner*—Richard E. Chilcot, Jr.
*Assistant Examiner*—K. Negash
*Attorney, Agent, or Firm*—Merchant & Gould Smith, Edell, Welter & Schmidt

[57] ABSTRACT

A system for very-long-distance transmission of a digital signal between a transmitter station and a receiver station, wherein the transmitter and receiver stations are connected by a monomode optical fiber with negative chromatic dispersion at the operating wavelength of the system, having a length of at least one thousand kilometers. The receiver station comprises device to compensate for the distortions due to the non-linear effects and to the chromatic dispersion introduced by the transmission line, the compensation device carrying out a positive chromatic dispersion of the received signal, the amplitude of the positive chromatic dispersion being a function notably of the amplitude of the negative chromatic dispersion induced by the optical fiber as well as of the mean on-line optical power of the signal transmitted on the optical fiber.

12 Claims, 2 Drawing Sheets

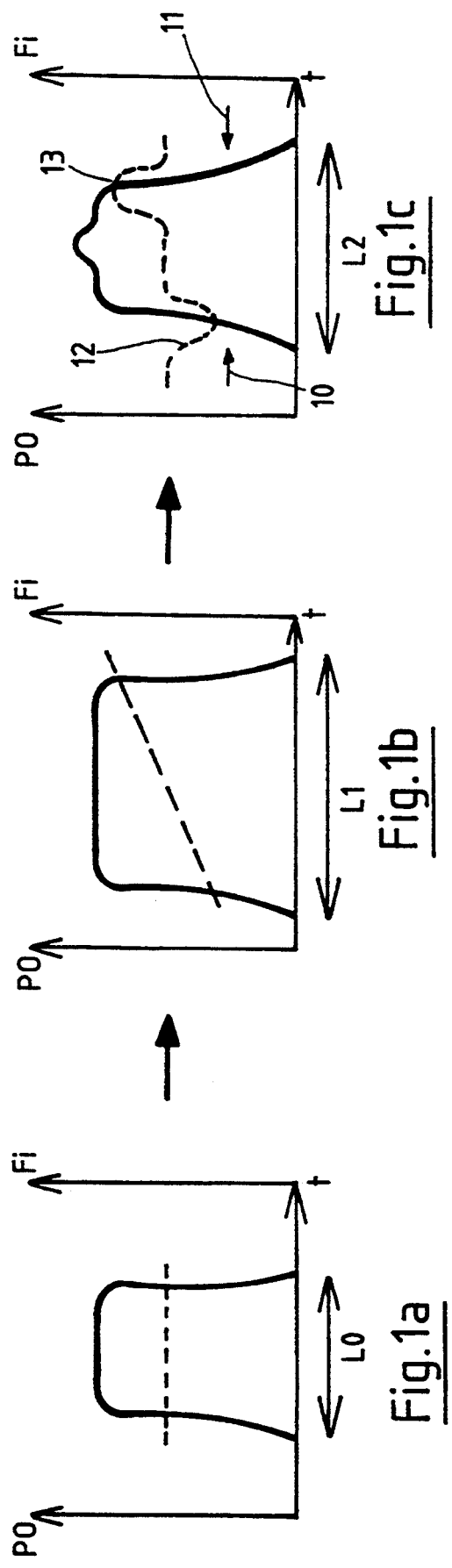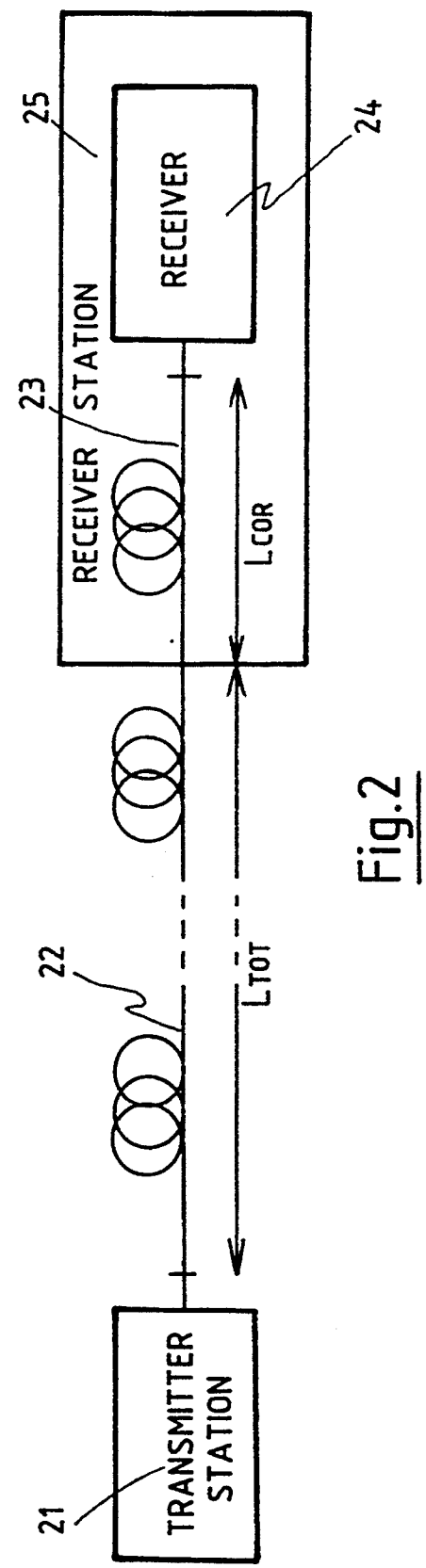

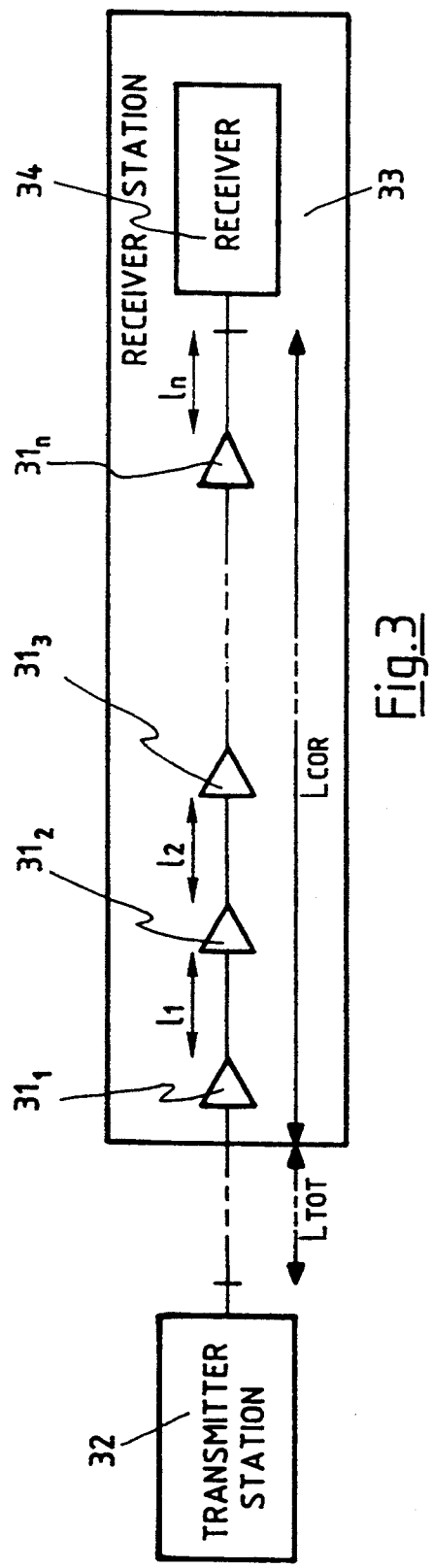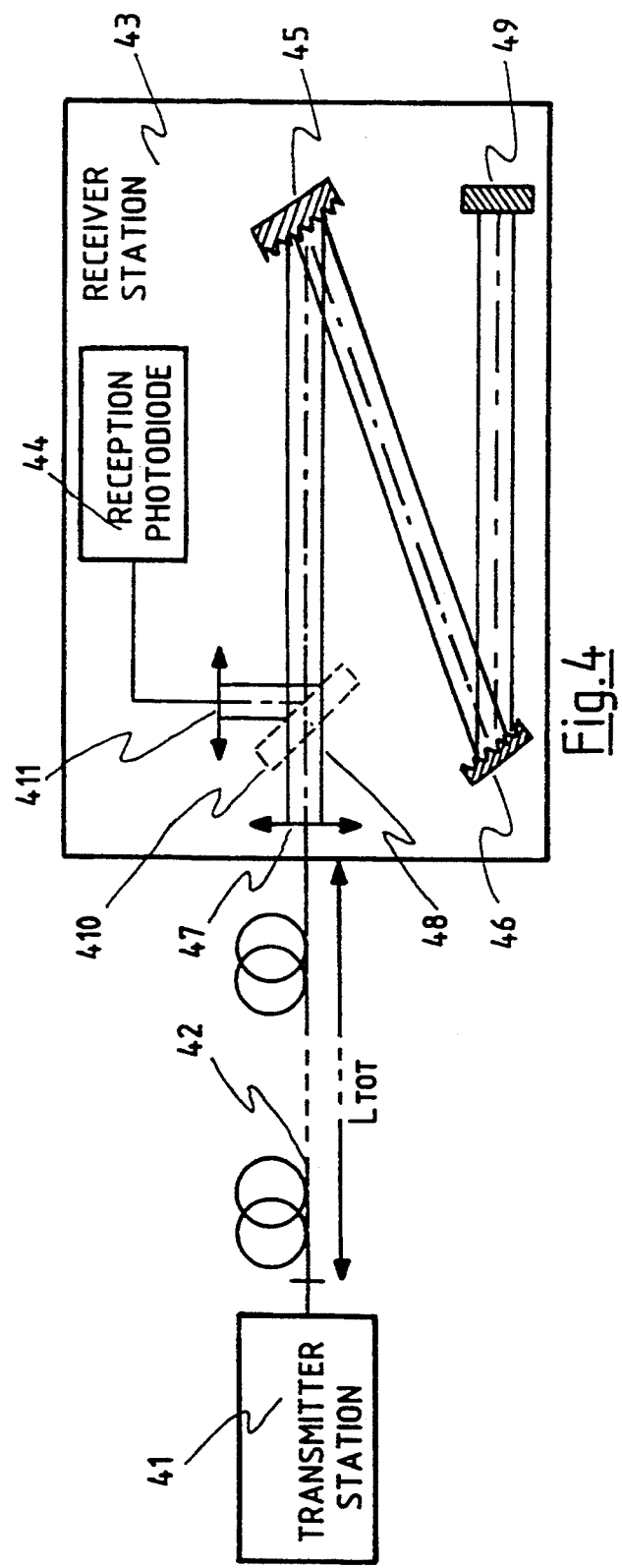

SYSTEM OF VERY-LONG-DISTANCE DIGITAL TRANSMISSION BY OPTICAL FIBER WITH COMPENSATION FOR DISTORTIONS AT RECEPTION

BACKGROUND OF THE INVENTION

1. Field of the Invention

The field of the invention is that of very-long-distance digital transmission (several thousands of kilometers) by optical fiber in systems using on-line optical amplification One of the main factors limiting the bit rate in very-long-distance systems such as these is the distortion induced by the transmission fiber.

For, while these distortions may be more or less overlooked in standard fiber-optic systems (setting up links over distances in the range of some humdreds of kilometers), they have, on the contrary, very disturbing effects on long-distance transmission systems.

The invention relates to a system of transmission on an optic fiber line enabling compensation, at reception, for this distortion induced by the transmission line, in the case of transmission lines having a length of at least a thousand kilometers, such as those used for trans-ocean links.

The distortion contributed by the transmission fiber arises out of the combined existence of two phenomena that occur in the monomode fibers: chromatic dispersion and non-linear effects.

The first phenomenon is that of chromatic dispersion. This phenomenon results from the frequency dependency of the refractive index of silica. It entails different propagation times depending on the operating wavelength. In general, chromatic dispersion tends to widen the pulses of the digital trains and, hence, to create inter-symbol interferences.

In the commonly-used fibers, the chromatic dispersion is zero around 1.3 μm and takes a positive value of about 17 ps/nm/km around 1.55 μm. It is also possible to use dispersion-shifted fibers which are designed to have zero chromatic dispersion in the region of 1.55 μm.

Very-long-distance transmission systems (covering several thousands of kilometers) work at 1.55 μm. The excessive value of the chromatic dispersion of the commonly used fibers at this wavelength rules out their use. Hence, dispersion-shifted fibers will be used in these cases.

It must be noted that the effect of distortion by chromatic dispersion depends greatly on the spectral components of the pulses: if a pulse shows variations in optical phase that are positive at its start and negative at its end, it will be greatly widened by a positive chromatic dispersion. The converse is true for negative dispersions.

The second phenomenon relates to the non-linear effects. The most important non-linear effect in a fiber is the Kerr effect. This effect, which is described for example in the document by K. W. Blow and N. J. Doran, "Non-linear Effects in Optical Fibers and Fiber Devices" (IEEE Proceedings, June 1987, pp. 138–144) reflects a linear dependency of the refractive index of silica with respect to the optical power.

The non-linear effect is very low in the usual fields of operation of the optical systems (distance smaller than 400 km and power below about 10 mW), but becomes non-negligible for very high power values (of the order of 1 W) or for very large propagation distances at reasonable levels of power (some thousands of kilometers in a periodic amplification system).

When there is no chromatic dispersion, the Kerr effect induces a self-phase modulation of the optical pulse: the instantaneous frequency diminishes at the start of the pulse and then increases at its end, proportionally to the derivative of the optical power. This induces a widening of the spectrum and a spectral composition that fosters a substantial widening for negative chromatic dispersions.

The distortion provided by the transmission fiber should be considered as the combination of the chromatic dispersion (the first phenomenon) and of the non-linear effects (the second phenomenon).

The combination of these two effects may be described by a non-linear equation with partial derivatives of distance and time, known as Schrödinger's non-linear equation, the resolving of which is discussed notably in the work by G. Agrawal, "Non-Linear Fiber Optics", Academic Press.

The numerical resolution of this equation shows that there are two forms of behavior which are qualitatively very different depending on the sign of the chromatic dispersion (D):

* First case: $D>0$. In this case, phenomena of instability of modulation are observed. The pulses "burst" into very short pulses at the end of 1000 to 2000 km and the optical spectrum widens considerably: this may give rise to problems related to the optical passband.
* Second case: $D<0$. There is no instability of modulation and the pulses keep a certain degree of integrity while the spectrum widens quasi-monotonically during the propagation, while keeping reasonable widths. However, the pulses widen greatly temporally, thus creating inter-symbol interferences. These interferences become very troublesome for example, as soon as the chromatic dispersion goes beyond 0.05 ps/nm/km in terms of absolute value for bit rates of 5 Gbits/s on distances of 6000 to 8000 km.

The most efficient case is naturally the second one, that of a negative chromatic dispersion. However, to make the very-long-distance systems work in negative dispersion mode, the values of chromatic dispersion of the fibers used must obligatorily be very low.

2. Description of the Prior Art

Any method of compensation for the two phenomena that are the cause of the distortion in the fiber (chromatic dispersion and non-linear effects) is therefore of great value since it can be used to overcome the drawback of the low values imposed on the chromatic dispersion. Indeed, by using a method of compensation for the distortion provided by the transmission fiber, it is possible to envisage two strategies.

In a first strategy, for given characteristics of negative chromatic dispersion of the transmission fiber, the compensation can be used to increase the product: line bit rate * range of the link.

In a second strategy, for a fixed line bit rate and a fixed range, the compensation makes it possible to use transmission line fibers having less stringent constraints as regards the characteristics of chromatic dispersion. These fibers are easier to manufacture on an industrial scale and to sort out for the setting up of an underwater link for example.

There are known methods of compensation for the distortion introduced by a fiber-optic transmission line.

A first known method, described for example by A. H. Gnauck et al in the article "Dispersion Penalty Reduction Using an Optical Modulator with Adjustable Chirp" OFC 1991, post-deadline paper No. 17, consists of the use, at transmission, of an optical amplitude modulator having adjustable chirp (or variation in instantaneous optical frequency).

This first method has been proposed solely in order to provide partial compensation for the penalties of chromatic dispersion on standard optical fibers in short-distance transmission systems (of some hundreds of kilometers).

Indeed, it has not been sought, in this method, to compensate for the non-linear effects, which are completely negligible in this case, but solely to compensate for chromatic dispersion.

Besides, this first known method specifically relates to standard optical fibers (with zero chromatic dispersion around 1.3 μm). Now, in very-long-distance transmission systems (of several thousands of kilometers), the excessive value of the chromatic dispersion of the commonly used fibers rules out their use, and then it is generally dispersion-shifted fibers (namely fibers with zero chromatic dispersion around 1.55 μm) that are used.

Finally, the compensation takes place at the transmitter station and hence by anticipation, and not at reception, on the actually disturbed signal.

It can therefore be clearly seen that this first known method is not suited to very-long-distance transmission systems and does not relate to a system of compensation for distortions at reception.

A second known method of compensation, described for example by T. Koyama et al. in the article, "Compensation for Non-Linear Pulse Distortion in Optical Fiber by Employing Prechirp Technique", ECOC 91., WeC7-2 p. 469, consists of compensation, at transmission, for the self-phase modulation generated by the non-linear effects.

To this end, the pulses are made to undergo a continuous scanning of the optical frequency, for the duration of a bit, by over-modulation of the sending laser.

What is used in this case is the fact that the optical frequency of a semiconductor laser is a function of its current. However, only certain structures of lasers can thus display high efficiency of frequency modulation, i.e. a major variation of this optical frequency, for a small variation of the control current and hence of the optical power.

This second known method has the drawback of requiring a particular over-modulation, which is synchronous with the useful digital train, on the sending laser used. Consequently, only certain types of lasers, those capable of providing a major variation of the optical frequency for a low variation of the control current, may be used in this second method.

Furthermore, this method can be applied only for a particular binary coding, namely the on-line RZ coding.

Furthermore, just as in the first method described, the compensation takes place at transmission and not at reception.

Finally, this method enables compensation solely for non-linear effects.

There are other known methods of compensation that work for the correction, at reception, of the distortion due to the combination of high positive chromatic dispersions and non-linear effects (in particular the chirp of the laser, this "chirp" of the laser being a parasitic effect that consists of a variation of the instantaneous optical frequency, during a pulse, especially at the beginning and end of this pulse).

These other methods use different structures (a Fabry-Pérot filter for example) which have the drawback of correcting the distortions only very partially.

In particular, the non-linear effects are not compensated for by these known equalizers or filters. Now, the change from a transmission line with a length of some hundreds of kilometers to a line with a length of over a thousand kilometers leads to a situation where it is not longer possible to overlook the non-linear effects.

Indeed, these non-linear effects become as important, if not more important, than chromatic dispersion. Consequently, a specific solution has to be found in order to resolve this new problem.

The invention is aimed notably at overcoming these different drawbacks of the prior art.

More specifically, it is an aim of the invention to provide a system capable of compensating for the distortion induced by a transmission line with a length of at least a thousand kilometers on a monomode optical fiber with negative chromatic dispersion.

Another aim of the invention is to provide a system such as this providing compensation for the combination of the two phenomena induced by the transmission fiber, namely the negative chromatic dispersion and the non-linear effects, and not solely for either one of these phenomena.

The invention is also aimed at providing a system such as this, capable of being implemented irrespectively of the type of laser used at transmission.

Another aim of the invention is to provide a system such as this that is simple to implement and reliable and that costs little.

SUMMARY OF THE INVENTION

These aims and other that shall appear here below are achieved according to the invention by means of a system for the very-long-distance transmission of a digital signal between a transmitter station and a receiver station, said transmitter and receiver stations being connected by a monomode optical fiber with negative chromatic dispersion at the operating wavelength of the system, having a length of at least one thousand kilometers, said optical fiber inducing a negative chromatic dispersion and non-linear effects, the combination of said non-linear effects and of said negative chromatic dispersion giving distortions to the digital signal received by said receiver station, said receiver station comprising means to compensate for said distortions, said compensation means carrying out a positive chromatic dispersion of said received signal, the amplitude of said positive chromatic dispersion being a function notably of the amplitude of the negative chromatic dispersion induced by said optical fiber as well as of the mean on-line optical power of said signal transmitted on said optical fiber.

The invention therefore relates specifically to systems of very-long-distance transmission. According to the invention, there is used a monomode optical fiber with negative chromatic dispersion which appears to be the only one suited to long distances.

According to the invention, the amplitude of the positive chromatic dispersion that makes it possible to carry out the compensation is not only a function of the amplitude of the negative chromatic dispersion induced by the optical fiber but takes account also of the mean on-line optical power.

The fact of taking account of the mean on-line optical power can be used to take account of the non-linear effects. Indeed, the non-linear effects, which are specific to the very-long-distance links, are a function of this mean on-line optical power.

In other words, while the known methods consist in compensating for the negative chromatic dispersion induced by the fiber in carrying out a positive chromatic dispersion with an amplitude that is precisely equal to that of the negative chromatic dispersion, the invention proposes to compensate for the distortions due to the combination of the negative chromatic dispersion and the non-linear effects induced by the fiber, in achieving a positive chromatic dispersion, the amplitude of which is not equal (except in particular cases) to that of the negative chromatic dispersion and is a function of the optical power.

Furthermore, in short-distance transmission, since the mean on-line optical power does not come into play in the computation of the compensation for the distortions, it may advantageously be increased in order to increase also the signal-to-noise ratio and hence to reduce the bit error rate (BER).

By contrast, in long-distance transmission, the mean on-line optical power plays a role in the computation of the compensation for distortions since the non-linear effects are a function of this optical power. In the case of the invention, the value of the optical power results therefore from a compromise: it should be neither too high, to prevent the non-linear effects from being reduced, nor too low in order that the signal-to-noise ratio may be high enough.

After propagation in a fiber that displays negative dispersion and induces varying levels of non-linear effects, a pulse tends to widen. This widening notably prompts inter-symbol interference.

In the system according to the invention, the pulses received are compressed at reception by being made to undergo a positive chromatic dispersion. This compression causes the disappearance of the inter-symbol interference and therefore improves the quality of the transmission.

It must be noted that the setting up of a positive chromatic dispersion at reception, firstly, in manner that can be easily understood, enables compensation of the negative dispersion due to the transmission fiber but also, secondly and far more surprisingly, enables compensation for the non-linear effects.

Indeed, it is known in the field of optical transmission that non-linear effects appear during long-distance transmissions. It is also known that, owing to these non-linear effects, the optical spectrum at output of the transmission line is greatly widened, the factor of widening being dependent on the optical power.

Now, according to conventionally accepted ideas, any means that induces a high chromatic dispersion produces major distortions on a wide spectrum. Those skilled in the art are therefore clearly encouraged to refrain from using means that give high (positive) chromatic dispersion to try and reduce thye distortions due to the combination of the (negative) chromatic dispersion and of the non-linear effects induced by the transmission fiber.

The invention therefore runs counter to these conventionally accepted ideas since it specifically recommends the use of such means giving a high (positive) chromatic dispersion to a received signal having a wide spectrum owing to the non-linear effects.

In other words, the invention provides a particularly simple solution to the problem, specific to long-distance transmission, represented by the combined compensation for negative chromatic dispersion and for non-linear effects, in showing that, contrary to ideas conventionally accepted in the field of optical transmission, the use of well chosen positive chromatic dispersion means can enable the restitution of an exploitable corrected signal.

Advantageously, said amplitude of the positive chromatic dispersion is also a function of the electrical pass band of said receiver station as well as of the digital signal sent out by said transmitter station.

In this way, the compensation for the distortions induced by the combination of the negative chromatic dispersion and of the non-linear effects is further improved.

Advantageously, said digital signal is encoded according to the NZ or NRZ binary format.

In a first advantageous embodiment of the invention, said compensation means include at least one section of optical fiber with positive chromatic dispersion at said wavelength of operation.

Advantageously, said compensation means include at least one optical amplifier and at least two fiber sections with positive chromatic dispersion, each of said amplifiers being interposed between two consecutive fiber sections.

In this way, the attenuation of the fiber is compensated for and the receiver receives sufficient power for its operation.

Advantageously, said compensation means include at least two fiber sections with positive chromatic dispersion chosen from among a set of fiber sections having at least two different lengths, so as to adjust said amplitude of the positive chromatic dispersion.

In this way, the assessment of the amplitude of the positive chromatic dispersion to be applied, which generally calls for the use of intensive and complicated computer programs of digital simulation, may be carried out simply by a trial-and-error system on an installed link.

This also makes it possible to determine the optimum compensation when the characteristic parameters of the transmission system (notably the amplitude of the negative chromatic dispersion induced by the transmission fiber, the electrical pass band of the receiver station, the signal sent out—whether or not it is phase/frequency modulated in addition to the amplitude modulation for example—, the mean on-line optical power, etc.) are not perfectly known before the installation of the link.

In other words, the length of the correction fiber is first of all assessed roughly: then the addition or the removal of different lengths makes it possible to obtain the length of fiber corresponding to the optimum compensation.

Advantageously, a first part of said compensation means is within the receiver station and a second part of said compensation means is outside the receiver station.

Thus, by placing a first part of the compensation means (i.e. a part of the length of the correction fiber) outside the receiver station, space is saved in the receiver station.

Furthermore, by placing a second part of the compensation means inside the receiver station, it becomes easy to work on the length of the compensation fiber by adding or removing small-sized fiber sections. Similarly, problems of optical level are easily handled by the positioning, in the reception station, of optical amplifiers.

In a second advantageous embodiment of the invention, said compensation means comprise at least one set of at least two diffraction gratings mounted so as to induce a positive chromatic dispersion.

This second embodiment is slightly more complex than the previous one but, in return, makes it possible to obtain better quality results.

Advantageously, the receiver station then comprises means to adjust the spacing and/or the inclination of at least one of said diffraction gratings.

Finally, it is quite possible to combine the two embodiments described here above.

BRIEF DESCRIPTION OF THE DRAWINGS

Other features and advantages shall appear from the following description of a detailed preferred embodiment of the invention, given by way of a non-restrictive example, and from the appended drawings, of which:

FIGS. 1a to 1c show curves of variation in optical power and instantaneous optical frequency as a function of time, the three figures corresponding respectively to the same pulse during the three successive steps following a transmission with a system according to the invention:
* sending of the pulse,
* reception of the pulse at the end of the line,
* compensation for the pulse after reception.

FIGS. 2 to 4 each show a simplified drawing of a distinct embodiment of a transmission system according to the invention, the compensation means respectively comprising:
* a fiber section with positive chromatic dispersion,
* fiber sections with positive chromatic dispersion and of different lengths, between which optical amplifiers are interposed,
* two diffraction gratings.

DETAILED DESCRIPTION OF THE INVENTION

In a system of long-distance digital transmission (extending to several thousands of kilometers) by optical fiber, using on-line optical amplitication, the optical pulses sent out undergo a distortion. This distortion is due to the fiber itself and comes from the combination of the non-linear effects (the Kerr effect in particular) and of the chromatic dispersion in the transmission fiber.

Studies on the combination of these two effects (non-linear effects and chromatic dispersion) have shown that it is useful to make very-long-distance systems work in negative chromatic dispersion mode. However, the very small values of chromatic dispersion required make it difficult to obtain the transmission-line fiber.

The transmission system, which shall be described in detail here below, comprises means of compensation for the non-linear effects as well as for negative chromatic dispersion, these two types of phenomena being induced by the fiber of the transmission line.

Thus, by preserving a transmission fiber that has given negative chromatic dispersion characteristics, the system according to the invention can be used to increase the product: (on-line bit rate) * (range of the link).

Now, following another strategy, by preserving a fixed on-line bit rate and a fixed range, the system according to the invention enables the use of line fibers that have less stringent constraints as regards the characteristics of chromatic dispersion and are therefore easier to manufacture on an industrial scale.

FIGS. 1a to 1c each show two curves:
- a first curve of variation of the optical power PO as a function of time, shown in solid lines;
- a second curve of variation of the instantaneous optical frequency FI (corresponding to the derivative in relation to the time of the phase) as a function of the time t. This second curve is shown in dashes.

FIG. 1a corresponds to a pulse sent. The pulse has width $L_0$. The instantaneous frequency FI is constant. This pulse is transmitted through a very-long-distance fiber (length greater than 1000 km) of negative chromatic dispersion.

This same pulse received at the end of the line is shown in FIG. 1b. After propagation in a fiber of negative chromatic dispersion on the one hand, and showing major non-linear effects on the other hand, the pulse has widened (length $L_1$ greater than $L_0$), thus prompting inter-symbol interference. This pulse has an instantaneous frequency FI (derived with respect to the time of the phase) that is quasi-linear, with a slope corresponding to the chromatic dispersion undergone. Its spectrum has widened because of non-linear effects. The lowest frequencies are at the start of the pulse and the highest frequencies at the end of the pulse.

According to the invention, this pulse is compressed at reception by being made to undergo a positive chromatic dispersion. FIG. 1c shows a pulse that has undergone a compression such as this. The low frequencies have been slowed down (10) and the high frequencies have been accelerated (11). This compression makes the inter-symbol interference disappear and therefore improves the quality of the transmission.

It will be noted that this compensation does not restore the initial pulse precisely. Because of the non-linear effects, the optical frequency diminishes at the start (12) of the pulse and then rises at its end (13). However, this is of no consequence from the viewpoint of the digital signal.

The pulse obtained after compensation is also short, even shorter than the pulse emitted. This makes it possible to recover an eye-opening rate, at reception, that is equal to or better than the rate at transmission.

FIGS. 2 and 3 show two variants of a first embodiment of the transmission system according to the invention.

The simplest transmission system to implement is shown in FIG. 2.

The signal transmitted is formed by a train of pulses, each of these pulses (such as the one shown in FIG. 1a) is generated by a transmitter station 21. This pulse gets propagated in a segment 22 of fiber having a length $L_{tot}$ (in kilometers) and having a mean chromatic dispersion per kilometer $D_{moy}$ (in ps/nm/km) such that $D_{moy}$ is negative.

After propagation, the pulse will have undergone a negative dispersion D (in ps/nm) with $D=D_{moy}*L_{tot}$. The pulse then has the characteristics of a pulse such as the one shown in FIG. 1b.

According to the invention, the transmission system comprises, at reception, a fiber with positive chromatic dispersion that makes it possible to compensate for the distortions due to the combination of the negative chromatic dispersion, on the one hand, and of the non-linear effects, on the other.

If, at reception, there is a correction fiber available with a mean positive chromatic dispersion per kilometer $D_{cor}$ (in ps/nm/km), it is possible to make a segment 23 of this fiber with a length $L_{cor}$.

The amplitude of the positive chromatic dispersion induced by this segment 23, namely $L_{cor}*D_{cor}$ should be such that the distortions are compensated for.

This amplitude of the positive chromatic dispersion is a function of several parameters, and notably of:
- the amplitude of the negative chromatic dispersion induced by the transmission fiber segment 22;
- the mean on-line optical power transmitted by the fiber segment 22;
- the electrical pass band of the receiver 24 of the receiver station 25;
- the signal sent by the transmitter station 21.

In this first embodiment, it is assumed that all these parameters are well defined. In this case, the amplitude of the chromatic dispersion $L_{cor}$ of the correction fiber segment 22 to be used may be computed, for example, by means of digital simulations taking account of all the parameters brought into play.

There is thus a device available, providing for a chromatic dispersion with a sign opposite that of the line and enabling the elimination of the distortions. The receiver receives a pulse possessing the characteristics of a pulse such as is shown in FIG. 1c (the elimination of inter-symbol interference and the improvement of quality of the received and corrected signal).

The receiver station 25, located downline from the transmission fiber 22, includes the correction fiber 23 as well as the receiver 24.

Of course, in order that the compensation may be applicable, the section $L_{cor}$ should not be too long in relation to $L_{tot}$. It is therefore extremely desirable to have $|D_{cor}|>>|D_{moy}|$. If, for example, $|D_{cor}/D_{moy}|=100$, the length $L_{cor}$ will correspond to only 1% of the length $L_{tot}$, which would appear to be reasonable from the viewpoint of its construction.

The transmission system shown in FIG. 2 seems however to be relatively difficult to implement as such. Indeed, it does not take a certain number of problems into account.

Thus the correction fiber, especially if it has a substantial length, shows a certain degree of attenuation. If this attenuation is excessive, it will not be possible to add on the fiber as such as the end of the line, for the receiver in this case would not receive sufficient power to ensure its operation.

An alternative to this system is shown in FIG. 3. In this variant, the length $L_{cor}$ is divided into n smaller sections $l_1, l_2, \ldots l_n$, between which there are interposed optical amplifiers $31_1$ to $31_n$, to maintain the level of power.

In this way, a pulse generated by a transmitter station 32 is propagated in a fiber with a length $L_{tot}$ and undergoes a negative dispersion D. Inside the receiver station 33, the pulse is then propagated by n fiber sections with a length $l_1, l_2, \ldots l_n$, providing in all for a chromatic dispersion $L_{cor}*D_{cor}$. The optical amplifiers $31_1$ to $31_n$, interposed between the fiber sections with a length $l_1, l_2, \ldots l_n$, make it possible to compensate for the attenuation due to the correction fiber formed by n sections. The pulses transmitted to the receiver 34 therefore does not show any inter-symbol interference.

Furthermore, it may be that the parameters of the transmission line are not defined before the line is laid. For example, it may be that there is no precise a priori knowledge of $D_{moy}$ because of uncertainties related to manufacture, or because $D_{moy}$ varies from one link to another. In the same way, it is sometimes impossible to simulate the mean on-line optical power with precision.

It should therefore be possible to adjust $L_{cor}$ to each link. To do this, it is useful to divide the correction fiber into sections that are very short with respect to the expected $L_{cor}$. The addition or removal of these elementary sections during the installation then makes it possible to obtain the optimum length with a precision that is all the more efficient as the elementary sections are small with respect to the expected $L_{cor}$.

If it is sought to further improve the precision of the compensation, it is possible to resort to a system according to the "boxes of weights" principle. Use is made, firstly, of the greater lengths which give approximate compensation and, secondly, shorter lengths which enable the compensation to be adjusted to its optimum value.

Finally, the question that arises is that of the physical location of the correction fiber. This physical location may be in a transmission line cable on a terminal section, or else inside the receiver station.

The first approach, which consists in placing the correction fiber in a transmission line cable, namely outside the receiver station, has the advantage of saving space in the receiver station but has two drawbacks:
- it will be very difficult to make adjustments in the event of error on $L_{cor}$ (especially in the case of an underwater link where the cable is in the sea),
- any repairs to the cable in a terminal section is liable to modify $L_{cor}$ and hence to degrade the compensation.

The second approach, in which the correction fiber is placed inside the receiver station, appears to be more flexible. This second approach is worthwhile notably if the precise compensation length is not known or if this length changes following modifications on the line. Indeed, it is then easier to take action on the length of compensation fiber by adding or by removing small-sized fiber sections. Similarly, the problems of optical level can be easily managed by placing optical amplifiers in the receiver station.

Finally, a third approach combines the above two approaches: a part of the correction length is in a cable in a terminal section and another part, which may be adjustable, is in the receiver station.

An exemplary structure of this first embodiment gives excellent results. The system, in this example, is a trans-ocean link with a length of 8,000 kilometers, at a bit rate of 5 Gbits/s and an operating wavelength of 1.55 μm. The line is constituted by sections of shifted-dispersion fibers with a negative dispersion $D_{moy}$ at 1.55 μm.

Between these sections, at every 40 km, there are interposed optical amplifiers that compensate for the losses.

The fact of working at a wavelength equal to 1.55 μm makes it possible easily to obtain the above-mentioned fibers with high positive dispersion. It suffices to make use of usual fibers with a chromatic dispersion of about 17 ps/nm/km at 1.55 μm.

In taking, for example, the case $D_{moy} = -0.1$ ps/nm/km, the pulses then undergo a total negative dispersion during the propagation of: $D_{moy}*8000$ km $= -800$ ps.

In this specific case, the inventors have found that the correction fiber length to be used for the compensation is equal to 50 km. It must be noted that if only the negative chromatic dispersion induced by the transmission fiber is taken into account, then the length would be equal to:

$$-(-0.1 \times 8000)/17 = 47 \text{ km}.$$

It is clear, in this example, that the compensation for the combination of the non-linear effects and of the negative chromatic dispersion is different from a simple compensation for the negative chromatic dispersion (compensation of the type implemented for short-range transmissions).

As the case may be, the length of the correction fiber may be greater or smaller than the computed length, taking account solely of the negative chromatic dispersion of the transmission fiber.

In short, the following are the characteristics of the transmission system:
- length of the link: 8000 km;
- bit rate: 5 Gbit/s;
- wavelength of use: 1.55 $\mu$m;
- NRZ coding;
- optical amplifiers at a distance of 40 km from each other and each having a noise excess of 6 dB;
- transmission fiber:
  * attenuation: 0.2 dB/km,
  * chromatic dispersion: $-0.1$ ps/nm/km,
- level of signal at output of amplifier: $-3$ dBm,
- correction fiber:
  * length: 50 km,
  * chromatic dispersion: 17 ps/nm/km.

The following results are obtained:
- without compensation: there is a eye-opening penalty of 2 dB at reception. This penalty is related to the phenomena of propagation and leads to an error rate of about $10^{-9}$;
- with compensation: the cancellation of the eye-opening penalty makes it possible to obtain an error rate better than $10^{-12}$. If an increase is made in the value of the corrective positive chromatic dispersion (D greater than 800 ps/nm), it is even possible to obtain an improvement of the eye diagram ($+1$ dB) with respect to the diagram at transmission.

A second exemplary embodiment has also given very good results. This second exemplary embodiment is differentiated from the first one solely by the following characteristics:
- length of the link: 7960 km,
- transmission fiber:
  * chromatic dispersion double that of the first example: $-0.2$ ps/nm/km,
- correction fiber:
  * length double that of the first example: 100 km.

The following results are obtained:
- without compensation: there is a eye-opening penalty of 5.5 dB that leads to an error rate of about $10^{-5}$;
- with compensation: the cancellation of the eye-opening penalty makes it possible to obtain an error rate better than $10^{-12}$.

FIG. 4 shows a second embodiment of the system of transmission according to the invention. The system comprises a transmitter station 41 generating optical pulses. These optical pulses are transmitted by a fiber 42 up to a receiver station 43. The transmission fiber 42 has a total length $L_{tot}$ and a total negative chromatic dispersion ($-D$).

The receiver station 43 comprises a receiver photodiode 44 as well as an assembly based on diffraction gratings 45 and 46. This assembly is aimed at inducing a positive chromatic dispersion that makes it possible to compensate for the negative chromatic dispersion ($-D$) of the fiber 42 as well as the non-linear effects induced by this same fiber 42.

The general principle of this assembly is described in G. P. Agrawal, "Non-Linear Fiber Optics", Academic Press, 1989, chapter 6. However, in this document, the assembly is specifically designed for the compression of ultra-short pulses. There is no question whatsoever of compensating for the distortions in a transmission system.

In other words, the invention adapts known pulse compression means to a totally distinct field, namely very-long-distance transmission, and for a different application, namely that of compensation for distances, and more specifically that of compensation for distortions resulting from the combination of the negative dispersion and of the non-linear effects induced by the fiber.

Pulses propagated in the fiber 42 have their spectra widened after propagation. They go through a first lens 47. The optical beam 48 coming out of this first lens 47 is then sent through two diffraction gratings 45 and 46. The pulses are compressed during a dual passage through these two diffraction gratings. The optical beam is reflected on a first mirror 49 and goes through the two diffraction gratings 45 and 46 a second time. This dual passage makes it possible to restore a circular cross-section to the optical beam (a section that has become ellipsoidal again because of the first passage) and to multiply the compression factor by two.

The first mirror 49 is slightly inclined in order to separate the incident beam from the reflected beam. A second mirror 410 (shown in dashes and located in a raised plane with respect to the plane of the figure) receives the beam reflected by the first mirror 49 and deflects it, without introducing additional losses therein, towards a second lens 411. The reception diode 44 finally receives compressed pulses without inter-symbol interference.

Thus, by computing the spacing and inclination between the two diffraction gratings, it is possible to obtain an induced chromatic dispersion that enables the distortions to be compensated for with precision.

If the chromatic dispersion of the link is not known exactly, it is possible to modify the spacing and the angle between the two diffraction gratings by mechanical translation-rotation of these two gratings. This enables the positive chromatic dispersion of compensation to be adjusted as efficiently as possible.

In this compensation assembly based on diffraction gratings, the passing of the beam into the open air probably results in substantial losses. It is then possible to provide for a system in which this compensation assembly is preceded (or followed) by an optical amplifier so that the pulses arrive with the right level at the receiver photodiode.

This second embodiment is slightly more difficult to implement than the first one, but makes it possible to obtain more precise compensation.

It is therefore possible also to provide for a system that successively comprises, at reception, a optical correction fiber according to the first embodiment (and makes it possible to obtain a rather rough compensation) and an assembly of diffraction gratings according to the second embodiment (this assembly being designed to obtain a finer compensation from the rough compensation that has already been obtained).

What is claimed is:

1. A system for a very-long-distance transmission of a digital signal between a transmitter station and a receiver station, wherein said transmitter and receiver stations are connected by a monomode optical fiber with negative chromatic dispersion at an operating wavelength of the system, having a length of at least one thousand kilometers, said optical fiber inducing a negative chromatic dispersion and non-linear effects, a combination of said non-linear effects and of said negative chromatic dispersion giving distortions to the digital signal received by said receiver station, and wherein said receiver station comprises compensation means for compensating for said distortions, said compensation means being connected to said monomode optical fiber, said compensation means carrying out a positive chromatic dispersion of said received signal, an amplitude of said positive chromatic dispersion being a function notably of an amplitude of the negative chromatic dispersion induced by said optical fiber as well as of a mean on-line optical power of said digital signal transmitted on said optical fiber.

2. A system according to claim 1, wherein said amplitude of the positive chromatic dispersion is also a function of an electrical pass band of said receiver station as well as of the digital signal sent out by said transmitter station.

3. A system according to claim 1, wherein said digital signal is encoded according to the RZ or NRZ binary format.

4. A system according to claim 1, wherein said compensation means includes at least one section of optical fiber with positive chromatic dispersion at said wavelength of operation, which is connected to said monomode optical fiber.

5. A system according to claim 4, wherein said compensation means includes at least one optical amplifier and at least two fiber sections with positive chromatic dispersion, each of said amplifier being interconnected between two consecutive fiber sections.

6. A system according to claim 4, wherein said compensation means includes at least two fiber sections with positive chromatic dispersion chosen from among a set of fiber sections having at least two different lengths, so as to adjust said amplitude of the positive chromatic dispersion by choosing which fiber section or fiber sections among said at least two fiber sections must be connected to said monomode optical fiber.

7. A system according to claim 4, wherein a first part of said compensation means is within the receiver station and a second part of said compensation means is outside the receiver station.

8. A system according to claim 1, wherein said compensation means comprises at least one set of at least two diffraction gratings connected to said monomode optical fiber so as to induce a positive chromatic dispersion.

9. A system according to claim 8, comprising means to adjust a spacing and/or an inclination of at least one of said diffraction gratings.

10. A system according to claim 1, wherein said compensation means includes:

at least one section of optical fiber with positive chromatic dispersion at said wavelength of operation; and at least one set of at least two diffraction gratings.

11. A system for a very-long-distance transmission of a digital signal between a transmitter station and a receiver station, wherein said transmitter and receiver stations are connected by a monomode optical fiber with negative chromatic dispersion at an operating wavelength of the system, having a length of at least one thousand kilometers, said optical fiber inducing a negative chromatic dispersion and non-linear effects, a combination of said non-linear effects and of said negative chromatic dispersion giving distortions to the digital signal received by said receiver station, and wherein said receiver station comprises compensation means for compensating for said distortion, said compensation means being connected to said monomode optical fiber, said compensation means carrying out a positive chromatic dispersion of said received signal, an amplitude of said positive chromatic dispersion being a function notably of an amplitude of the negative chromatic dispersion induced by said optical fiber as well as of a mean on-line optical power of said signal transmitted on said optical fiber, and wherein said compensation means include at least two fiber sections with positive chromatic dispersion chosen from a set of fiber sections having at least two different lengths, so as to adjust said amplitude of the positive chromatic dispersion.

12. A system for a very-long-distance transmission of a digital signal between a transmitter station and a receiver station, wherein said transmitter and receiver stations are connected by a monomode optical fiber with negative chromatic dispersion at an operating wavelength of the system, having a length of at least one thousand kilometers, said optical fiber inducing a negative chromatic dispersion and non-linear effects, a combination of said non-linear effects and of said negative chromatic dispersion giving distortions to the digital signal received by said receiver station, and wherein said receiver station comprises compensation means for compensating for said distortions, said compensation means being connected to said monomode optical fiber, said compensation means carrying out a positive chromatic dispersion of said received signal, an amplitude of said positive chromatic dispersion being a function notably of an amplitude of the negative chromatic dispersion induced by said optical fiber as well as of a mean on-line optical power of said signal transmitted on said optical fiber, and wherein said compensation means includes at least one set of at least two diffraction gratings mounted so as to induce said positive chromatic dispersion.

* * * * *